Figure 1:
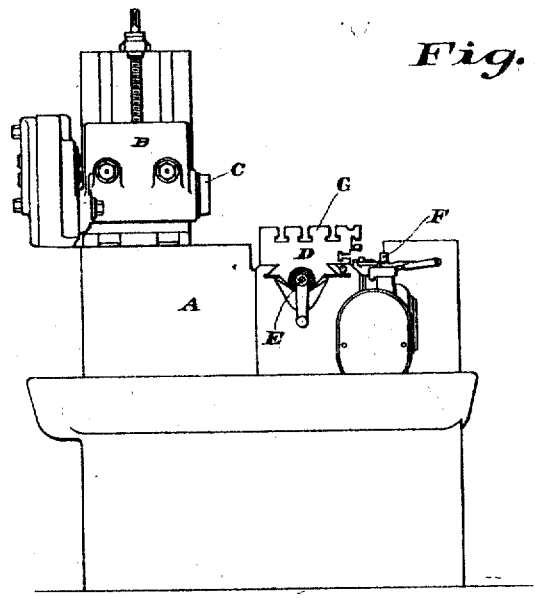

R. T. HAZELTON & S. EINSTEIN.
AUTOMATIC TABLE LOWERER.
APPLICATION FILED OCT. 12, 1916.

1,273,365.

Patented July 23, 1918.
2 SHEETS—SHEET 1.

Inventors
Sol Einstein and
Robert T. Hazelton
By their Attorney
Albert F. Nathan R. T. HAZELTON & S. EINSTEIN.
AUTOMATIC TABLE LOWERER.
APPLICATION FILED OCT. 12, 1916.
1,273,365.
Patented July 23, 1918.
2 SHEETS—SHEET 2.
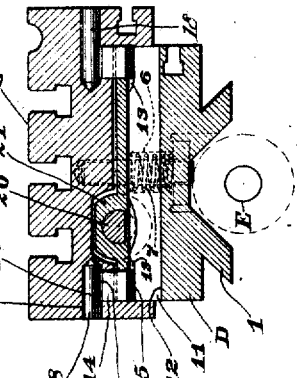
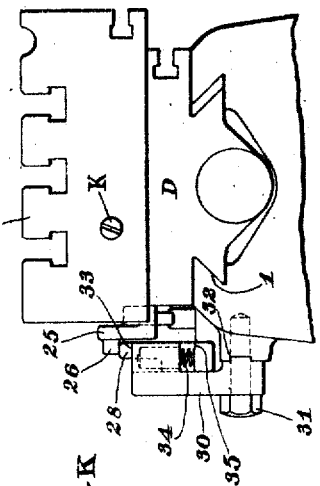
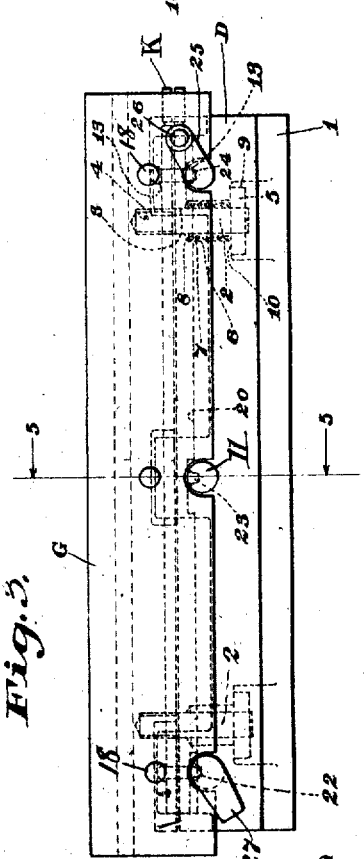
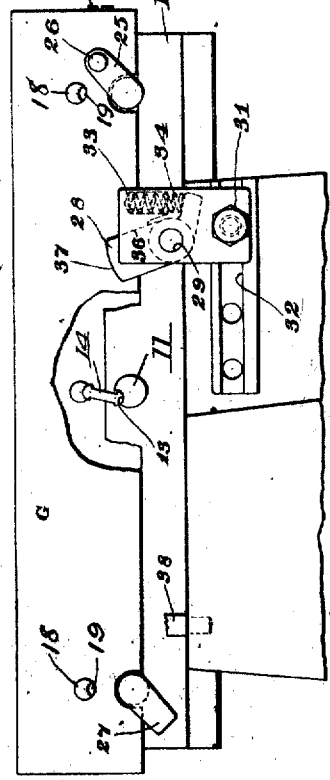
Inventors
Sol Einstein and
Robert T. Hazelton
By their Attorney
Albert F. Nathan

UNITED STATES PATENT OFFICE.

ROBERT T. HAZELTON AND SOL EINSTEIN, OF CINCINNATI, OHIO, ASSIGNORS TO THE CINCINNATI MILLING MACHINE COMPANY, OF CINCINNATI, OHIO, A CORPORATION OF OHIO.

AUTOMATIC TABLE-LOWERER.

1,273,365.  Specification of Letters Patent.  Patented July 23, 1918.

Application filed October 12, 1916. Serial No. 125,235.

*To all whom it may concern:*

Be it known that we, ROBERT T. HAZELTON and SOL EINSTEIN, citizens of the United States, and residing at Cincinnati, in the county of Hamilton and State of Ohio, have invented a new and Improved Automatic Table-Lowerer, of which the following application is a full disclosure.

This invention deals with feed mechanisms for regulating the character, extent and duration of the cutting action of a tool with respect to the work, and it proposes an improvement whereby certain operations may be conducted automatically that have heretofore been performed manually. In various tool operations it has been customary to provide a certain amount of "relief" for the tool with relation to the work during the return stroke so as to prevent the tool from marring the appearance of the already machined surface. This action has been accomplished automatically in various ways, but in all of these instances the construction has been such as to leave a tapered line at the end of the cut. This peculiarity has greatly diminished the utility of these mechanisms, because they are incapable of satisfactorily milling against a shoulder. That is to say, in certain cases, as in milling a slot with an end mill or in slab milling to a shoulder with a spiral cutter, it is highly desirable to cut the shoulder in a clean cut manner with sharp corners and with full depth. This cannot be done with such table-lowering devices as have heretofore been proposed for the reason that they are all so arranged that at least part of the lowering takes place during the forward stroke or cutting stroke; consequently the cutter is shied away from the work so as to produce an inclined end instead of a squared shoulder. This defect appears prominently when such machines are put into practical usage and it prohibits their use for many classes of high grade work.

This invention, therefore, endeavors more especially to render available a table-lowering arrangement which will avoid this defect and which will mill a perfectly squared or a perfectly arc-shaped shoulder. The herein disclosed mechanism has, therefore, been designed so as to provide the work support with means for automatically retracting or withdrawing the work from the cutter only during the return stroke of the table, and in embodying this broad principle special effort has been made to create a very simple, durable and effective way of achieving the automatic retraction.

This invention, therefore, endeavors more especially to create a few-part organization which may be applied to any existing table without disturbing the usual automatic feeding means preferred, and which will cause the table to be automatically raised into a cutting position during the return stroke of the work and automatically lowered to clear the cutter also during the return stroke of the work. Another is to design an exceedingly simple table retracting means in which all of the parts and elements will be rugged, capable of being easily made, and effective to operate efficiently and durably in connection with milling machines of any existing construction and without requiring elaborate changes in the arrangement thereof.

Another object of this invention is to create a table-lifting mechanism operating on the toggle principle and so arranged that the lines of thrust are distributed throughout different portions of the table and so devised that when the table is raised it will be very rigidly and unyieldingly mounted on the main table, or traveler, thereby obviating any give under the pressure of the tool.

Another object is to arrange the aforesaid mechanism in such a manner that it can easily be actuated by tripping dogs mounted on the main table.

Another object is to devise a table-lowering mechanism in which an escapement dog will permit passage of the table without operation during its advance stroke and will cause operation during its return stroke, and in which the mechanism in general will not in any manner interfere with the ordinary table reciprocating means and control dogs therefor.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof; all as more completely outlined herein.

To enable others skilled in the art so fully to comprehend the underlying features thereof that they may embody the same by the numerous modifications in structure and relation contemplated by this invention, drawings depicting a p ferred form have been annexed as a part of this disclosure, and in such drawings, like characters of reference denote corresponding parts through all the views, of which:—

Figures 6, 7:
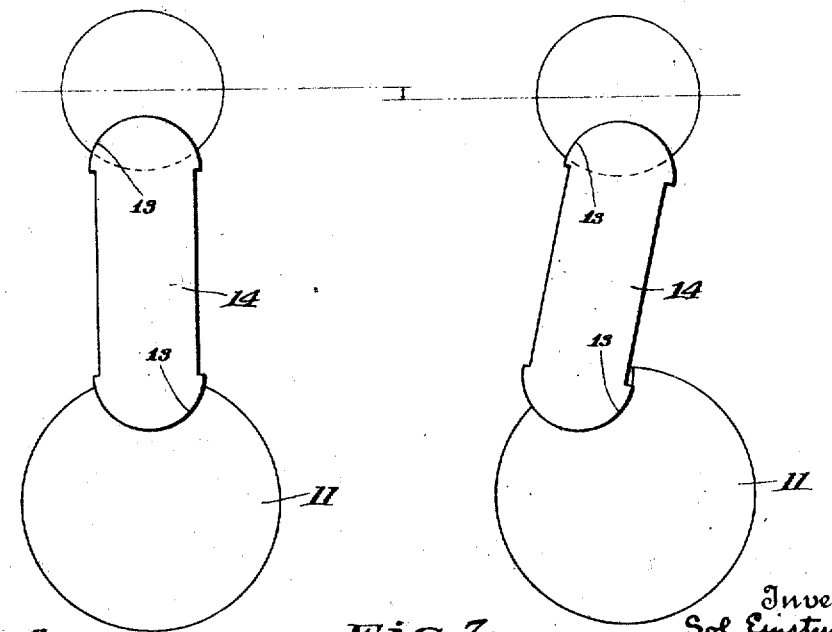

Figure 1 is a side elevation of a complete machine embodying this invention. Fig. 2 is a front elevation of the table-lowering mechanism isolated from the table-feeding mechanism showing the same in the table-lowering position. Fig. 3 is a similar view showing the same in the table-raised position. Fig. 4 is an end elevation of Fig. 2 showing certain details of the dogs. Fig. 5 is a section through line 5—5 of Fig. 3. Figs. 6 and 7 are views showing the different positions of the links employed for elevating the table.

Continuing now by way of a more detailed analysis of this invention, it may be observed that it contemplates a two-part or compound table embodied in any conventional type of milling machine in association with the usual table-feeding instrumentalities. The herein disclosed adaptation of this invention shows the manner in which it can be applied to any conventional milling machine in such a way as to immediately combine with the table-feeding devices without necessitating a rebuilding of the general machine. The conventional table, so to speak, will be replaced by a compound table in which the lower part is fed and actuated in the usual manner, but in which the upper deck is caused automatically to rise and fall at predetermined stations of the lower part or traveler.

Referring now to the drawings, A indicates the bed of a conventional milling machine which has a head B carrying a tool-supporting spindle C in overlying relation with the work supporting means. Mounted to reciprocate on the bed A is the base element or traveler D of the compound table and this traveler is propelled in a conventional manner by means of a feeding element E; the operation of which is automatically controlled by suitable trip-mechanism indicated in general by F. The mechanism thus far described may be regarded as thoroughly conventional and, therefore, need not be elaborated in detail, although reference may be had to co-pending application of Robert T. Hazelton, Ser. No. 27,323, filed May 11, 1915, for a detailed description of an appropriate mechanism.

The traveler D is provided with guideways 1 arranged to slide in corresponding ways in the bed A, being reciprocated by the above indicated mechanism. This traveler carries an overlying work-support or table G which has affixed thereto a number of depending pins 2 that extend downwardly through apertures 3 in the traveler whereby the same is guided during its raising and lowering movement. These pins are secured in any appropriate manner to the work support, as by means of screw threads 4, and coöperating with these pins is a means for limiting the uplifting of the table and for assisting its depression. Thus, a nut 5 is carried by the lower end of the pin 2 and the hole through the traveler is chambered out, or enlarged, as is indicated by 6 to receive an expansile spring 7 that at one end presses against the shoulder 8 and at its other end against the nut 5 so as to urge the table downward. The nut 5 is contained within a socket 9 in such a way that it can be adjusted to bear strongly against the shoulder 10 thereby limiting the uplift of the table and locking it strongly in its uplifted position to prevent any such vibration or free play as would tend to produce chatter marks in the work.

The uplifting means is preferably constructed so as to exert force at distributed points on the table thereby avoiding undue deflection thereof and to that end a series of lifters in the nature of dogs are spaced along the table. Referring to Fig. 5, 11 indicates a shaft which is rotatably contained within the aperture 12 transverse to the traveler D, and at its ends, this shaft is provided with semi-circular recesses 13 cut into its upper periphery and extending in an axial direction. These recesses contain the lower ends of struts 14 which have their upper and lower ends rounded in semi-cylindrical manner, as indicated by 15 and 16. The table has apertures 17 bored cylindrically into its sides and into these apertures are inserted hardened pins 18 which contain semi-circular recesses 19 for receiving the upper end 16 of the strut 14 and act as wear blocks therefor. It will be perceived that the elements 11 and 14 in effect constitute small toggles, of which the strut 14 is one link and the shaft 11 is the other. The proportioning of the parts is such that when the table is elevated the elements 11 and 14 have passed slightly over the dead center position, thereby locking the table effectively in its elevated position. This is shown by the "high" position of Fig. 6, and in such an instance nut 5 is so adjusted as to press very tightly against the shoulder 10, thereby in effect clamping the table in its upraised position.

In order that all of the toggles shall be moved synchronously they are interconnected by a suitable means such as the rod 20 which extends longitudinally through the rib 21 of the traveler D and at appropriate intervals is provided with teeth 22, 23 and 24 entering the grooves 13 in the rock-shafts and thereby compelling them to move as a unit and compelling all of them at all times to occupy the same relative positions. It will be seen that if any one or more of the elements 11 are rocked that all must move simultaneously. A crank 25 is keyed to the one rock-shaft and is provided with a pin or extension 26 affording a compact surface for tripping the same. This crank is here used merely for lowering the table, and another crank 27 secured to another rock-shaft at the other end of the table is utilized for raising it. The lowering is accomplished by means of an escapement dog 28 which is pivotally carried by a pin 29 secured to a support 30 which, by means of a bolt 31 can be adjustably secured to the side of the bed A, preferably through the agency of the guide-way 32. This support provides a lug 33 which houses an expansile spring 34 that bears against the toe 35 extending from the dog 28 with the effect that said dog is constantly urged clockwise against a shoulder 36 formed by the side edge of the extension 33. Now, when the traveler is being advanced in the direction of the arrow the table is uplifted and the tool is machining the work, and when the contact surface 26 hits the near edge of the dog 28 it merely swings said dog aside so as to lower its upper edge and permit it to ride underneath the pin 26. But, as soon as the traveler starts to return, the pin 26 hits the upper curved contact surface 37 of the dog 28 and, as the shoulder 36 prevents it from turning, the dog is able to lift up the pin 26 thereby swinging the arm 25 and the shaft 11 anti-clockwise with the consequence that the toggles are broken and the table is permitted to be urged down by its weight augmented by the springs 7. As the table nears the end of its return stroke the arm 27 impacts the dog 38 which is adjustably or otherwise secured to the bed A and this arm 27 is thereby turned clockwise with the effect that the toggles are all again erected and thrown from their dead centers into the locking position. The table is now raised and thereupon it begins its advance stroke. It will be noted that the arm 25 extends upwardly and the arm 27 downwardly from its rock shaft and the contact surfaces are preferably in different planes of travel, as shown by the drawings.

This invention also embodies means for limiting the "throw" of the rod 20 and thus determine the extent to which the toggles overthrow their dead-centers. This enables the table to be definitely locked in its raised position because no amount of reflex thrust will tend to swing the toggles back over their dead-centers since the downward thrust acts in the opposite manner. The stop for thus limiting the shift of the rod 20 comprises a screw K which is threaded into the end of the table G so as to lie opposite the end of rod 20. This element is accordingly also adjustable and permits of taking up wear.

In consequence of this arrangement, the machine is enabled to mill against a squared shoulder and to achieve the various other objects hereinbefore enumerated.

Without further analysis, the foregoing will so fully reveal the gist of this invention that others can by applying current knowledge readily adapt it for various applications without omitting certain features that, from the standpoint of the prior art, fairly constitute essential characteristics of the generic or specific aspects of this invention, and therefore such adaptations should and are intended to be comprehended within the meaning and range of equivalency of the following claims.

Having thus revealed this invention, we claim as new and desire to secure the following combinations of steps and elements, or equivalents thereof, by Letters Patent of the United States:—

1. A table-lowering mechanism combining a traveler; a table carried thereby; means for raising and lowering the table relatively thereto; and mechanism for releasing the traveler before the operation of said means.

2. A table-lowering mechanism combining a traveler; means for returning the traveler; a table; and mechanism for moving the table relatively to the traveler during the returning of the traveler.

3. A table-lowering mechanism combining a traveler; means for periodically reciprocating the traveler; a table; and mechanism operative to lower the table relatively to the traveler during the returning action of said means, and operative to raise said table previous to the advancing action of said means.

4. A table-lowering mechanism combining a traveler; means for reciprocating said traveler; a table carried by said traveler; mechanism for raising and lowering said table on said traveler; and an escapement-dog inoperative to actuate said mechanism during the advance stroke of said table but operative during its return stroke.

In witness whereof, we hereunto subscribe our names as attested by the two subscribing witnesses.

ROBERT T. HAZELTON.
SOL EINSTEIN.

Witnesses:
H. T. WILLIAMS,
W. PEASLEE.